United States Patent [19]

Bok et al.

[11] Patent Number: 4,747,473

[45] Date of Patent: May 31, 1988

[54] SEGMENTED FRICTION BRAKE OR CLUTCH DISC ASSEMBLY

[75] Inventors: Lowell D. Bok, Anna; William T. Holzworth, Springfield, both of Ohio; Robert B. Mason, Mercer Island, Wash.

[73] Assignee: The B. F. Goodrich Company, Akron, Ohio

[21] Appl. No.: 875,849

[22] Filed: Jun. 19, 1986

[51] Int. Cl.[4] .............................................. F16D 65/12
[52] U.S. Cl. .............................. 188/73.2; 188/218 XL; 192/107 R
[58] Field of Search ........ 188/218 XL, 73.2, 366–367, 188/250 G, 250 B, 218 R; 192/107 R, 70.13, 70.14, 107 C, 107 T

[56] References Cited

U.S. PATENT DOCUMENTS

| | | | |
|---|---|---|---|
| 3,403,759 | 10/1968 | Holcomb, Jr. | 188/218 XL |
| 3,456,768 | 7/1969 | Holcomb, Jr. | 188/218 XL |
| 3,550,740 | 12/1970 | LeBlanc et al. | 192/107 R |
| 3,618,729 | 11/1971 | Ely et al. | 188/218 XL X |
| 3,625,319 | 12/1971 | Krause | 188/218 XL |
| 3,670,858 | 6/1972 | Van Horn | 188/218 XL X |
| 3,698,519 | 10/1972 | Crossman | 188/218 XL X |
| 3,726,374 | 4/1973 | Warren et al. | 192/107 R |
| 3,907,076 | 9/1975 | Crossman et al. | 188/218 XL |
| 4,007,814 | 2/1977 | Berger | 188/218 XL |
| 4,155,432 | 5/1979 | Krause | 188/218 XL |

*Primary Examiner*—Douglas C. Butler
*Attorney, Agent, or Firm*—Joseph Januszkiewicz

[57] ABSTRACT

A brake or clutch mechanism that has one of its stators or rotors composed of a plurality of circumferential spaced arcuate segments wherein each side portion of a segment has an off-set portion abuttingly engaging an adjacent off-set side portion such as to reinforce the off-set torque lugs which interconnect adjacent peripheral off-set lugs of the brake segments to provide axial reinforcement of the individual annular brake discs.

8 Claims, 2 Drawing Sheets

SEGMENTED FRICTION BRAKE OR CLUTCH DISC ASSEMBLY

BACKGROUND OF THE INVENTION

This invention relates to disc brakes and more particularly to segmented annular friction members useful in disc brakes or clutches. A segmented member formed into an annular disc brake or clutch is used as one of a plurality of axially aligned stator or rotor members of a brake or clutch. The invention as described in relation to an annular brake rotor member or assembly is useful in a high energy aircraft brake.

Assemblies of segmented friction components into an annular brake member for use in high energy braking are useful to avoid the problems caused by thermal warpage and cracking if such braking member were made into a solid annular component. A problem with linked segmented disc assemblies is that the structural rigidity is limited and the segments have too much freedom of movement. To maintain integrity of the segmented disc assemblies, drive lugs were used either along the outer periphery between the segments or along the inner periphery between the segments of the rotors and stators. A major problem with the drive lugs connected segmented discs has been lack of divisional uniformity, and as segments warp under thermal loads, the drive lugs tend to bend on their adjoining spline connection and, therefore, interfere with the proper operation of the brake.

The present invention is directed to the new and improved segmented disc brake assembly wherein each brake segment of the annular grouping is interconnected to the adjacent segment along their radial side perimeters to stabilize the segments in their axial movement under imbalance and centrifugal forces while permitting circumferential expansion yet maintaining their circumferential rigidity through their circumferential connection. Both the peripheral and radial interconnection of the individual segments are off-set to compliment the transfer of forces thereby ensuring complimentary full facial engagement of adjacent surfaces. Such an arrangement of complimentary interfitting of radial edges and circumferential connections enhance structural rigidity and maintains the discs in a run flat condition thereby eliminating imbalance and minimizes any tendency to cone out of the axially spaced planar braking segments thereby enhancing braking efficiency and axial stability.

SUMMARY OF THE INVENTION

According to the invention, an annular segmented friction brake assembly is provided with individual arcuate one-piece segments having off-set radially disposed side portions that abut with adjacent arcuate segments for circumferential rigidity while having their circumferential adjacent corners interconnected with off-setting clips that compliment the interconnecting side portion to prevent any tendency to cone out under centrifugal braking forces. Such configuration adds to the structural stiffness of the disc brake providing axial stability to the brake segments giving better wear life to the segments and requiring less maintenance. Such brake design enhances the life span of the brake disc.

DETAILED DESCRIPTION

Figure 1:
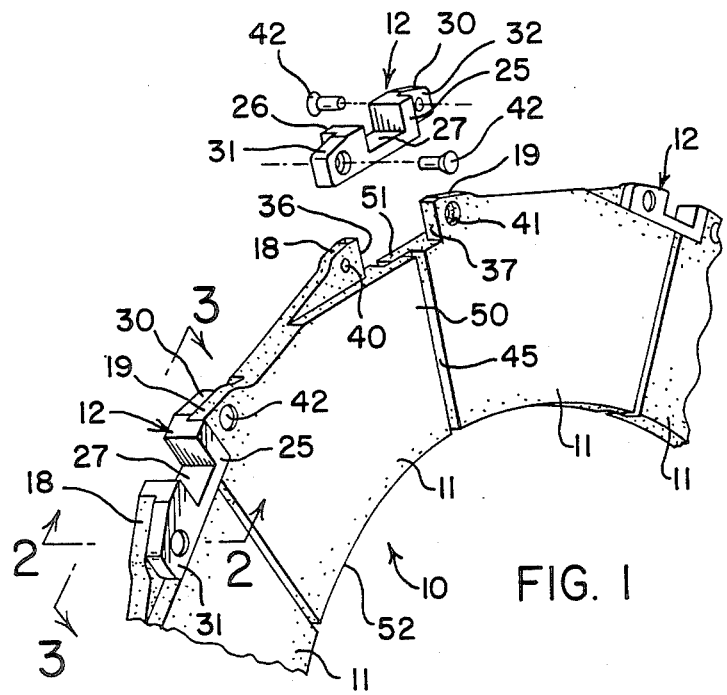
FIG. 1 is a fragmentary perspective view of a portion of a brake disc assembly showing a few of the arcuate friction brake segments with overlapping side portions with torque links interconnecting adjacent peripheral edges and with one torque link in exploded view.
Figure 4:
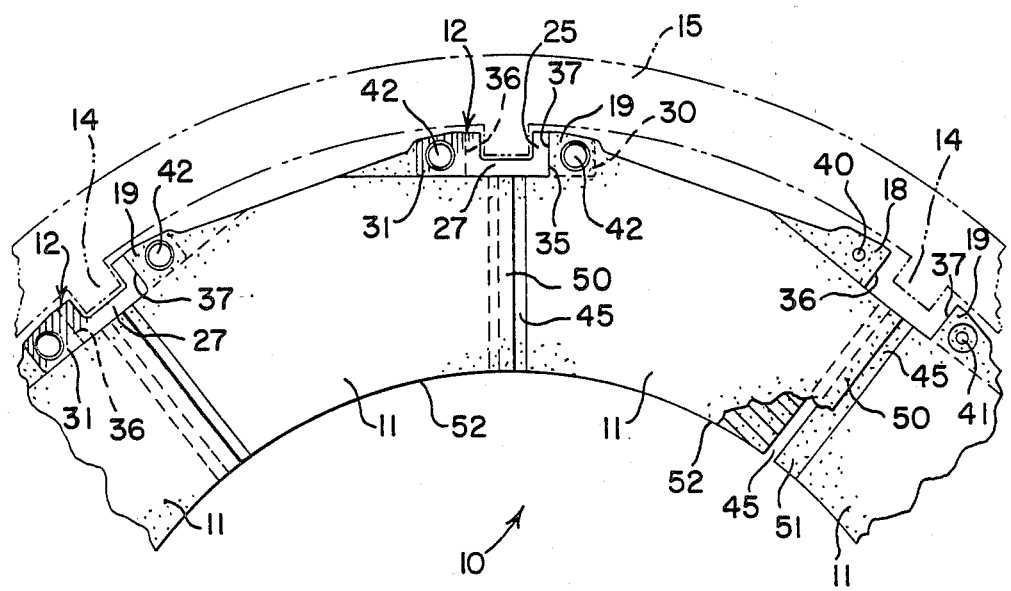
FIG. 4 is a fragmentary side elevational view of a part of an annular brake disc assembly with a portion broken away to more clearly show the overlapping side portions and the torque links in driving engagement with a rotatable wheel.
Figure 5:
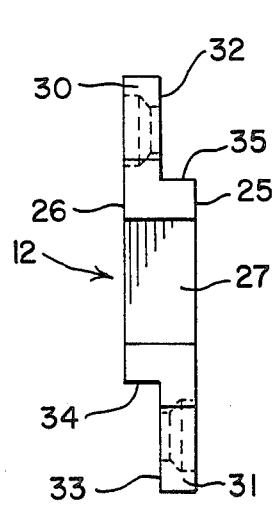
FIG. 5 is a plan view of a torque link.
Figure 6:
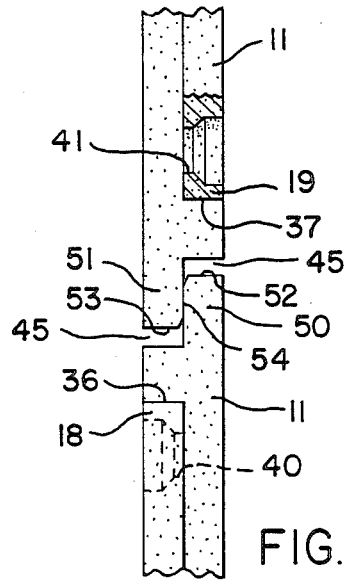
FIG. 6 is a fragmentary plan view of a portion of the brake disc assembly with a portion of one of the integral lugs 19 broken off and without the torque link in place.

Referring to the drawings, wherein like reference numerals designate link or corresponding parts throughout the several views, there is shown in FIGS. 1 and 4 a portion of an annular friction brake disc 10 having a plurality of circumferentially spaced arcuate brake segments 11 connected along their adjacent outer periphery by torque links or lugs 12. Each torque link 12 has a channel for receiving a driving lug or spline 14 of a rotating part such as a wheel 15. Although the torque link 12 is shown as connected at the outer periphery of segment 11 to splines 14 of a wheel 15, the torque link may be provided at the inner periphery of the friction brake segments to engage splines of a torque tube in which case the friction brake disc 10 would be a stator instead of a rotor as shown in FIGS. 1 and 4.

Each brake segment 11 is of a uniform thickness except for off-set side portions and a pair of integral lugs 18–19 at the respective upper peripheral corners thereof. Each of the lugs 18 and 19 are approximately one-half of the thickness of their respective segments 11 and are referred to as off-sets. Each individual segment 11 has one off-set lug 18 located on the outer peripheral edge while the other off-set lug 19 is located on the inner peripheral edge as viewed in FIG. 1. The respective brake segments 11 all have the same configuration, sector-shaped. The terms outer and inner are used in reference to the location of the torque flanges to be described in relation to the wheel and the torque tube and is used as a matter of convenience to describe the off-sets.

Figure 2:
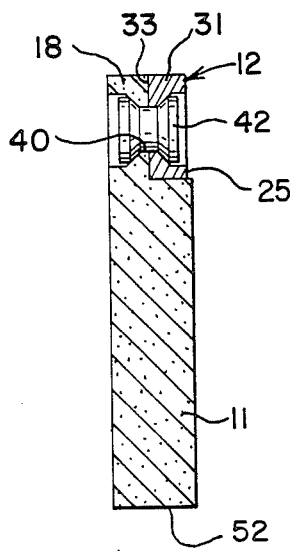
FIG. 2 is a cross sectional view of the brake disc assembly taken on line 2—2 of FIG. 1 showing in cross section one brake segment and torque link.
Figure 3:
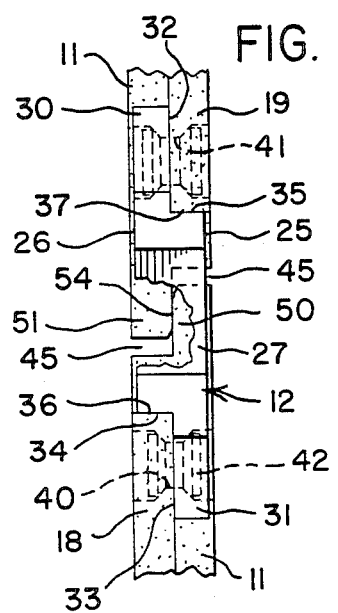
FIG. 3 is a fragmentary plan view of a portion of the brake disc assembly showing the torque link with a portion broken away to show the overlapping side edges of adjacent segments taken on line 3—3 of FIG. 1.

Each torque link 12 has a central U-shaped portion with side walls 25, 26 and a bridging portion 27. Each side wall 25 and 26 have flanges 30 and 31 extending circumferentially outwardly therefrom. The flanges 30 and 31 are off-set axially from each other presenting faces 32 and 33 (FIG. 3), respectively, which faces 32 and 33 are disposed in opposite directions. Flange 30 is considered an outer off-set engaging the inner peripheral off-set of the off-set lug 19 of brake segment 11 whereas flange 31 is considered an inner off-set engaging the outer peripheral off-set of the off-set lug 18 of brake segment 11. Each torque link 12 also has radially extending faces 34 and 35 (FIG. 3) for engaging the radially extending faces 36 and 37 of lugs 18 and 19, respectively (FIG. 4). Each lug 18 and 19 has holes 40 and 41 (FIGS. 2 and 3) in alignment with corresponding holes in the flanges 30 and 31 through which rivets 42 pass to interconnect the torque lugs to the respective segments in order to assemble a complete annular brake disc providing a clearance space 45 between the respective arcuate brake segments 11. The riveted connections are made to securely fasten the respective segments 11 into an annular brake disc eliminating any clearance between torque links and the segments 11 thereby enhancing the integrity and stiffness or rigidity of the joined segments into a unitary annular disc in cooperation with radial off-sets along their respective sides as to be described.

Each individual brake segment 11 has a pair of circumferentially spaced side edges that extend in a radial direction. Considering off-set lug 18 as outer, and off-set lug 19 as inner with respect to each segment 11 as per prior description, then one side edge of brake segment 11 has an inner off-set side portion 50 and an oppositely disposed outer off-set side portion 51. Each inner off-set side portion 50 extends as seen in FIGS. 1 and 4 from the innermost arcuate edge 52 towards the lug 18 while each outer off-set side portion 51 extends from the innermost arcuate edge 52 towards the lug 19. Each of such off-set side portions 50 and 51 are equal in thickness to one-half of the thickness of an arcuate segment such that the inside surfaces of such off-set side portions 50 and 51 abut each other along a line designated 54 (FIG. 3) which is a surface to surface contact. Thus, each brake segment in one complete annular brake disc has the respective adjacent off-set side portions abuttingly engaging each other while the adjacent upper circumferential lugs are secured to each other by a torque link 12 with off-setting flanges thereby giving rigidity and provide the effect of a solid annular brake disc in its operation.

As the annular discs of the above construction are rotated at high speeds, the enhanced axial stability makes the segments wear uniformly thereby improving on the heretofore designs. Such described design also enhances the ability of the brake discs to run flat and eliminates what was referred to in the art as a tendency to cone due to centrifugal forces, wherein the bottom peripheral portions of the brake segments 11 tended to move the segments into a non-vertical plane.

In the operation of the brake mechanism embodying the annular friction brake disc 10, the friction engaging planar surfaces of the segments 11 of the rotor will engage the respective friction surfaces of the stator discs. With the torque links having oppositely disposed off-set flanges 30 and 31 and adjacent brake segments 11 having abuttingly engaging side portions, the assembled one-piece segments are retained firmly in their planar positions adding to their structural stiffness and axial stability thereby extending the wear life of the annular brake disc while reducing maintenance over the life span of the brake segments because the brake discs run flat and there is even wear and a more uniform distribution of heat.

It should be understood that the foregoing disclosure relates to only a preferred embodiment of the invention and that modifications or alterations may be made therein without departing from the spirit and the scope of the invention as set forth in the appended claims.

We claim:

1. A segmented friction brake or clutch disc having a plurality of identical arcuate segments assembled to form an annular disc with parallel annular surfaces, each segment having a pair of oppositely disposed sides with side edges, said side edges lie along a radial line emanating from the centerline of said annular disc, the respective sides of each of said segments being recessed along the full length of their radial sides to define off-set side portions, said recesses being on opposite sides thereof to make adjacent side portions of adjacent segments have their off-set portions overlapping and in abutting contact, each segment having a lug on their two upper peripheral corners, and a torque link interconnects adjacent lugs of adjacent segments to maintain said segments into a rigid annular brake disc.

2. A segmented friction brake or clutch disc as set forth in claim 1 wherein each of said off-set side portions have flat surfaces lying in planar surfaces that are parallel to said parallel annular surfaces of said annular disc.

3. A segmented friction brake or clutch disc as set forth in claim 2 wherein said lugs on each segment are off-set, and each of said torque links have off-set portions that engage said off-set portions of said segments to provide a thickness that is no greater than the thickness of said annular disc.

4. A segmented friction brake or clutch disc as set forth in claim 1 wherein said parallel annular surfaces of said annular disc defines an inner surface and an outer surface, said lugs on each segment are off-set providing thicknesses that are less than the thickness of said segments, said lugs on each segment are spaced axial thereon to define an inner lug and an outer lug, said inner lug having a surface planar with said inner surface of said annular disc, said outer lug having a surface planar with said outer surface of said annular disc, and each of said torque links having circumferentially spaced flanges which are axially spaced relative to each other to abut axially spaced lugs of adjacent segments.

5. A segmented friction brake or clutch disc as set forth in claim 4 wherein said off set side portions on each segment is on the side opposite to the location of the lug closest to it to define a recess in line with said adjacent lug.

6. A segmented friction brake having a plurality of arcuate segments assembled to form an annular disc with parallel annular surfaces, each segment having a pair of spaced braking surfaces that lie in said parallel annular surfaces, one of said segment surfaces being an inner surface and the other one of said segment surfaces being an outer surface, each of said segments having a pair of circumferentially spaced sides, one of said sides being recessed to provide an abutment with a face being part of said inner surface, the other one of said sides being recessed to provide an abutment with a face being part of said outer surface, adjacent segments having adjacent abutments in overlapping abutting engagement, each segment having a lug on their upper peripheral corners, and a torque link interconnecting adjacent lugs from adjacent segments to maintain said segments into a rigid annular disc.

7. A segmented friction brake as set forth in claim 6 wherein the respective lugs on each segment are recessed to define axially displaced lugs relative to each other, and each of said torque links having axially displaced end flanges that are secured to said adjacent lugs.

8. A segmented friction brake as set forth in claim 7 wherein each segment has one lug from said one side recessed to define an off-set flange that has one surface as part of said outer surface and has the other lug from said other one of said sides recessed to define an off-set flange that has one surface as part of said inner surface to thereby present said flanges and abutments on the respective segments that are in substantial radial alignment on opposite sides of their respective segments.

* * * * *